United States Patent [19]

Maisel et al.

[11] Patent Number: 4,741,027

[45] Date of Patent: Apr. 26, 1988

[54] TRANSMISSION PATH SELECTION CIRCUIT IN A TELECOMMUNICATION NETWORK

[75] Inventors: Manfred Maisel, Igensdorf; Herbert Borutta; Uwe Bauer, both of Eckental, all of Fed. Rep. of Germany

[73] Assignee: U.S. Philips Corp., New York, N.Y.

[21] Appl. No.: 835,508

[22] Filed: Mar. 3, 1986

[30] Foreign Application Priority Data

Mar. 29, 1985 [DE] Fed. Rep. of Germany ....... 3511431

[51] Int. Cl.$^4$ ............................................. H04M 7/00
[52] U.S. Cl. .................................................... 379/221
[58] Field of Search ............... 379/220, 221, 225, 230, 379/113; 370/16

[56] References Cited

U.S. PATENT DOCUMENTS 3,705,523  12/1972  Alouisa ............................... 379/221

FOREIGN PATENT DOCUMENTS 1299734   7/1969  Fed. Rep. of Germany ...... 379/221
2517880  11/1976  Fed. Rep. of Germany ...... 379/221
2628426   2/1977  Fed. Rep. of Germany ...... 379/221
0658156  10/1986  Switzerland ........................ 379/221
2016873   9/1979  United Kingdom ................ 379/221

Primary Examiner—James L. Dwyer
Attorney, Agent, or Firm—Thomas A. Briody; Jack Oisher; William Streeter

[57] ABSTRACT

In military telecommunication networks a functional dialling number diagram is used independent from the network configuration. As the network structure in a military telecommunication network constantly changes and the subscriber can move to a different address at any moment, it is necessary to switch-through all the possible connection paths in the telecommunication network during the search for the called subscriber. So as to enable the connection set-up to be rapidly effected, connection set-up messages are transmitted outgoing from the exchange of the calling subscriber to all the exchanges connected to this exchange (parallel target search method).

To reduce the traffic load in the exchanges and to shorten the connection set-up times, a timing member is started in all the exchanges when a connection set-up message arrives. After the time delay has ended, the stored connection set-up message is cancelled again. Now the connection set-up message arriving first is used in the exchange of the called subscriber for establishing a connection to the calling subscriber station. During the time delay of the timimg member further connection set-up messges arriving in the exchange are not stored.

3 Claims, 2 Drawing Sheets

_4,741,027_

TRANSMISSION PATH SELECTION CIRCUIT IN A TELECOMMUNICATION NETWORK

BACKGROUND OF THE INVENTION

1. Field of the Invention

The invention relates to a transmission path selection method in a telecommunication network in which subscribers are interconnected through switching exchanges.

2. Description of the Related Art

In military telecommunication networks, the flexibility of the network configuration to adapt to subscriber displacement to a different switching exchange is of great tactical importance. To avoid the risk that such a telecommunication network becomes overloaded by a plurality of network management problems, a hierarchic, deterministic transmission path selection method, characterized by the code number path, cannot be used. Laid-open West German patent application DE-AS No. 17 62 807 discloses a method of searching for unoccupied connection paths in a telecommunication network, in which search messages are transmitted with a "snowball effect" (parallel target search method) over the connecting lines interconnecting the exchanges, when the called subscriber is assigned to a different exchange. The search reports (forward reports) are stored in each exchange and when the called subscriber is not assigned to a particular exchange such exchange transmits outgoing forward reports to all the other exchanges connected thereto.

Thus in the known method forward reports are transmitted via all the possible connection paths in a telecommunication network so that also a subscriber which has moved to another address (so that the location of this subscriber's device is not known before the connection is set up) can be found. As a result thereof it is also possible to effect a call set-up in a military telecommunication network in which the network structure changes continuously. On the other hand, the traffic load on the exchanges is increased when this known method is used.

SUMMARY OF THE INVENTION

The invention has for its object to improve a transmission path selection method such as disclosed in DE-AS No. 17 62 807 such that the traffic load in the exchanges can be reduced and the time required for setting up the connection can be shortened.

The method according to the invention has the advantage that the cost and design efforts for stores in the individual exchanges for storing the connection set-up reports (forward reports or search reports) can be reduced that the shortest and free connection path in the telecommunication network can be found in a simple way and manner.

BRIEF DESCRIPTION OF THE DRAWINGS

The invention will now be described in greater detail, by way of example, with reference to the embodiments shown in the accompanying drawings. Therein.

DESCRIPTION OF THE PREFERRED EMBODIMENTS

Figure 1:
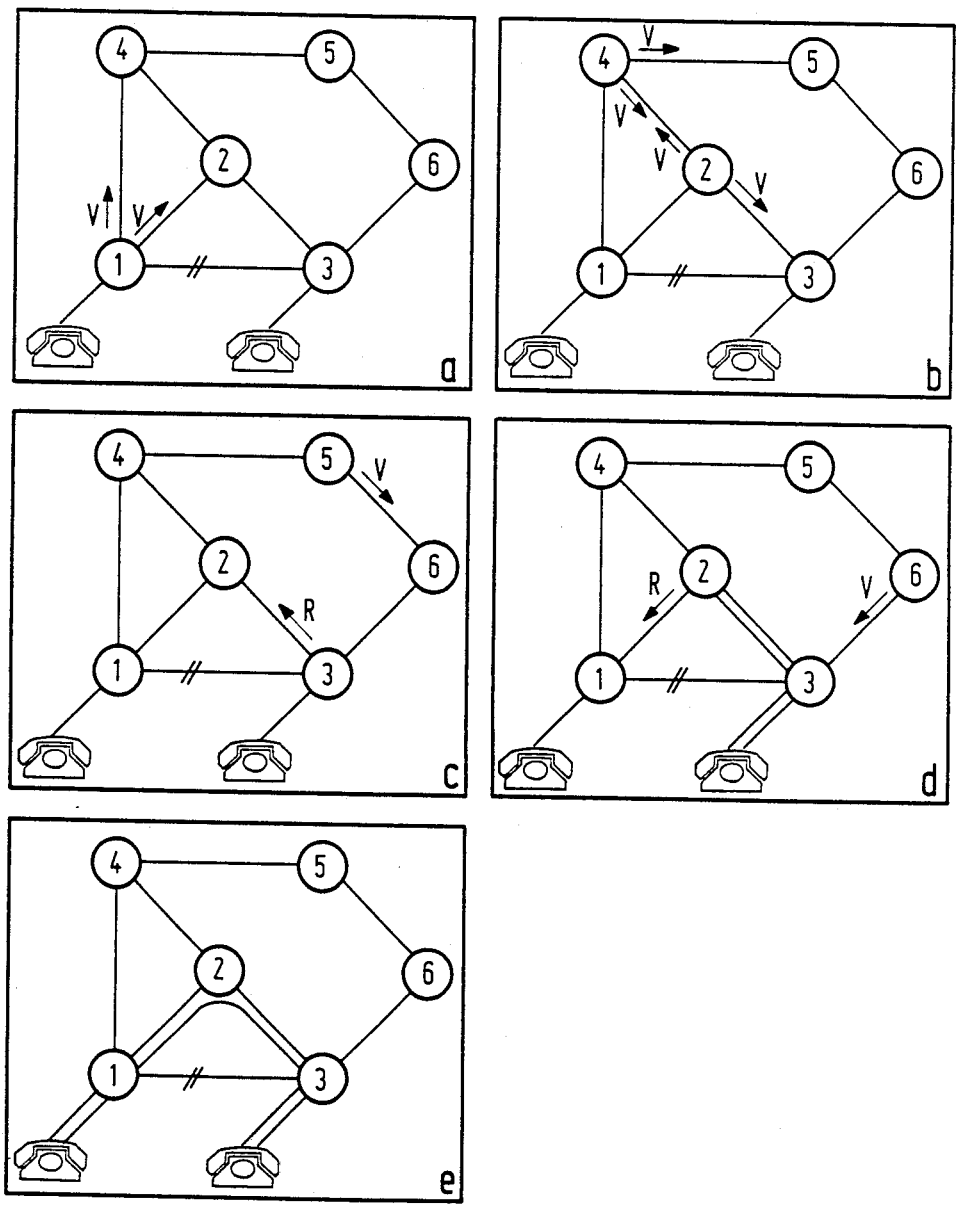
FIGS. 1(a)-1(e) show a structure of the telecommunication network employing the method of the invention and FIG. 2 shows the flowchart of the method according to the invention.

FIG. 1 shows the network configuration of a military telecommunication network including exchanges which are interconnected by connecting lines. In such a telecommunication network a functional call number diagram is used independently from the network configuration and the call set-up outgoing from the exchange of the calling subscriber (A-subscriber) is effected using a parallel target search method. In the telecommunication network three different messages are used for signalling, namely connection set-up messages V (alternatively designated forward messages or search messages) report-back messages R and enable messages. From the exchange of the A-subscriber, alternatively designated source or starting junction, the connections set-up messages V are transmitted through the telecommunication network to the exchange (target junction) of the called subscriber (B-subscriber). If the target junction (junction of the B-subscriber) is found, then by means of a report-back message R, transmitted through the path found in the opposite direction, sectionally from junction to junction a speech channel is seized and the connection is set up. When the conversation has ended, then the subscriber device of the subscriber breaking the connection transmits a cancel message, which section-by-section again releases the busy speech channels.

Hereinafter the connection set-up between the A-subscriber, connected to the junction 1 and the B-subscriber, connected to the junction 3, will be described in greater detail. To effect a connection to the B-subscriber, the A-subscriber dials the call number of the B-subscriber which is transmitted to the junction 1 via the subscriber's lines. The control arrangement provided in the junction 1 evaluates the call number of the B-subscriber, it thus being determined that an external connection is required. Outgoing from the junction 1 forward messages V are transmitted to all the junction connected to this junction 1 (in the embodiment the junctions 2 and 4). Simultaneously, the forward message V is stored in a store in junction 1. The junctions 2 and 4 (indirectly-routing junctions) ascertain, after having checked the forward message V, that the wanted subscriber is not located in their exchange area and (FIG. 1b) convey the forward messages V in all possible directions, the receiving direction expected. When the forward message V arrives, a timing member is started in the junctions 2 and 4 and the forward message V stored in the junctions 2 and 4 are erased again after the time delay has ended.

The junctions 2 and 4 send forward messages V over the connection lines to all the connected junctions, as a result of which the forward messages V outgoing from junctions 2 reaches the target junction 3 (junction of the B subscriber). This first forward message V is stored in the target junction 3 and the time member in junction 3 is started. The junction 3 now transmits (FIG. 1a) a report-back message R to the junction 2 whilst between junctions 5 and 6 a forward message V is transmitted via the connection lines. Simultaneously with the report-back message R the relevant transmission path selection is switched. It is a prerequisite that the B subscriber is not busy.

The forward messages V transmitted in both directions between the junctions 2 and 4 are erased during operation of the timing member, as now the report message V arrived first is no longer involved. The report-back message R transmitted from junction 3 to junction 2 is transmitted (FIG. 1d) in the reverse direction from junction 2 over the same path as the forward message V to the starting junction 1, a speech channel is seized and the connection is set up. During the transmission of the report-back message R from junction 2 to junction 1 the forward message V transmitted by junction 6 arrives in junction 3. Since this later forward message arriving over the indirect route through the junction 6 is not stored, so that the network load in the exchanges (junction) is reduced by means of the transmission path selection method according to the invention.

The connection set-up described in the foregoing, is based on the assumption that the connection line between junction 1 and junction 3 is interrupted. The forward messages V are transmitted in the described sequence also when all the connecting lines of the group of lines between junction 1 and junction 3 are busy, so that over this path no connection can be set up (blocking). However, this does not hold for calls having a higher priority, as then connections of a lower priority are broken. The telecommunication network shown in FIG. 1 has three different network junction types, namely starting junction, through or transit junctions and target junctions.

Figure 2:
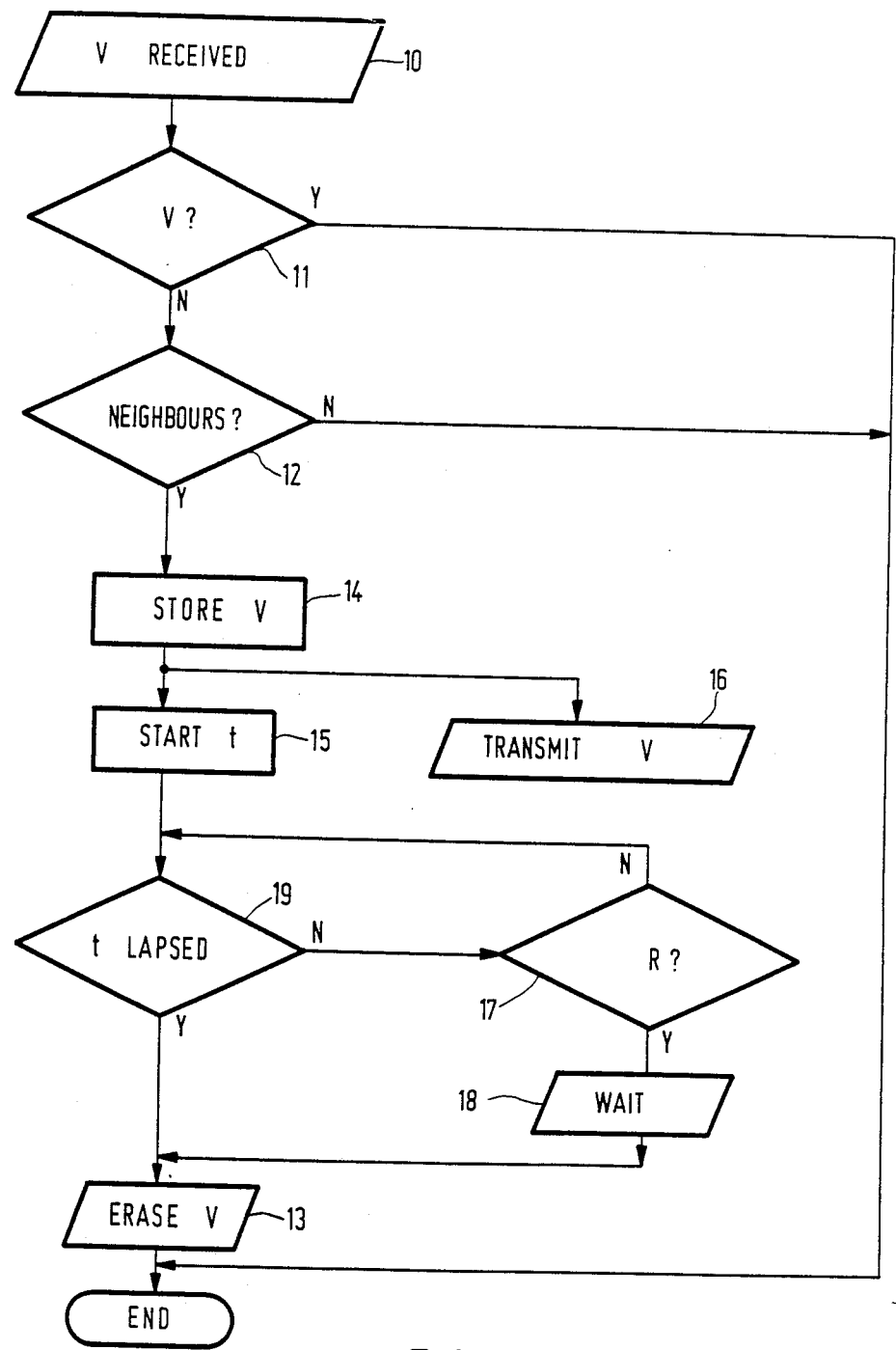

The processing of a forward message V in a transit junction will now be described in greater detail with reference to FIG. 2. When the report message V arrives in the transit junction (10) then it is checked whether the forward message (11) V is the first forward message. If yes, then a control arrangement in the transit junction checks whether a junction with adjacent junctions is concerned (12). If no, then the forward message V is not stored as no forward message V can arrive to this transit junction via a different connection path. If, in contrast therewith a junction is involved which has adjacent junctions, then the forward message V is stored (14) and a timing member is started (15). The processing time require for this check, whether a junction having or not having adjacent junctions is concerned, is not shown in FIG. 2. After the processing time in the transit junction, forward messages V are transmitted from this transit junction to adjacent functions (16), the direction from which the forward message V was transmitted excepted.

If a connection is set up by this transit junction, then the forward message remains stored in the junction until the conversation has ended. The forward message V is then erased by the erase message.

If a negative report-back message is transmitted by the transit junction, that is to say no connection to the B-subscriber can be effected, as this subscriber is busy or the group of connection lines is blocked, then the report message V is erased and the timing member is reset.

For the case in which no connection was set-up by the junction, the stored forward message V is erased again (13) after the time delay of the timing member has ended (19).

What is claimed is:

1. A transmission path selection method in a telecommunication network including an exchange which is interconnected via connecting lines in which when a called subscriber is assigned to a different exchange than a calling subscriber, connection set-up messages are transmitted from the exchange of the calling subscriber to other exchanges connected to the calling subscriber exchange and stored in such other exchanges, the reception of an incoming connection set-up message starts a timing member in each exchange, that after the time delay of the timing member has ended the stored connection set-up message is erased and if the receiving exchange is the called subscriber exchange, only the connection set-up message arriving first to said subscriber exchange is used for establishing a connection to the calling subscriber station.

2. A transmission path selection method as claimed in claim 1, characterized in that a further connection set-up message arriving at an exchange during said exchange's time delay are not stored.

3. A circuit arrangement for performing the method claimed in claim 1, characterized in that each of said exchanges include a timing member, a store means and a control arrangement connected in said telecommunication network through which messages are transmitted, that the control arrangement is connected to the timing member and starts or resets the timing member and that the control arrangement is connected to the store means and stores and erases therein the connection set-up message arriving first.

* * * * *